Feb. 17, 1942.  J. W. MUMFORD  2,273,368
FLOWER HOLDER
Filed Aug. 20, 1940

INVENTOR
JOHN W. MUMFORD
BY
J. Stuart Freeman
ATTORNEY

Patented Feb. 17, 1942

2,273,368

UNITED STATES PATENT OFFICE 2,273,368

FLOWER HOLDER

John W. Mumford, Philadelphia, Pa.

Application August 20, 1940, Serial No. 353,358

1 Claim. (Cl. 24—6)

The object of the invention is to provide improvements in flower holders, but more particularly in a type which is especially designed and adapted for use as a support for a single flower (or small bunch of flowers) or boutonniere in the lapel of a man's coat, or other similar arrangement.

Another object is to provide a holder of this type which is made entirely of wire or the like, and comprises an upper looped portion for receiving and preventing lateral movement of the calyx or other portion of a flower or flower stalk, a lower looped portion for receiving and similarly preventing lateral movement of the stem of the said flower, and an intervening connecting portion or shank which inturn comprises a safety pin section, by means of which the holder is detachably secured to a garment or other supporting element, as for instance when it is desired to mount a bunch of sweet peas or the like upon the upwardly extending surface of a cushion incident to a funeral or other event, a clasp for the end of said pin comprising a rearward extension of said lower looped portion.

A further object is to provide a device of this character, which can be formed from a single piece of wire, except possibly for a securing band or the like, if thought necessary, wherefore the cost of production is maintained at an exceedingly low figure.

A further object is to provide a modified form of the device in which the upper loop conforms to variable radii, so as to provide circumferentially spaced, inwardly extending, abruptly curved portions, adapted to "pinch" into the calyx of a carnation or the like and thereby prevent it from rotating angularly or shifting longitudinally.

Figure 1:
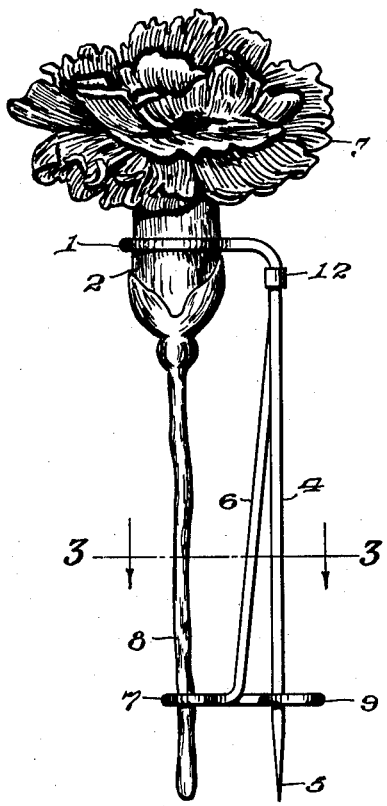
Figure 2:
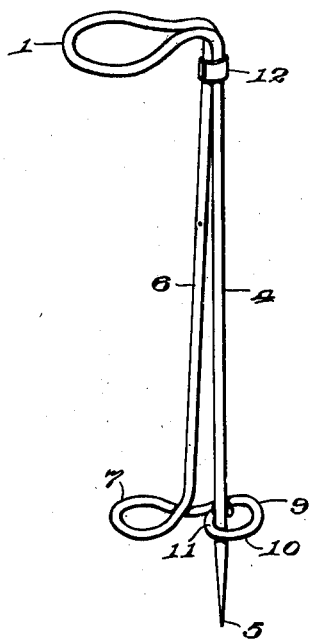
Figure 3:
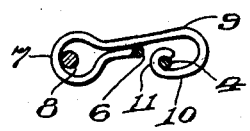

With the objects thus briefly stated, the invention comprises further details of construction and operation, which are hereinafter fully brought out in the following description, when read in conjunction with the accompanying drawing, in which Fig. 1 is a side elevation of a flower holder comprising one embodiment of the invention; Fig. 2 is a perspective view of the holder per se; Fig. 3 is a horizontal section on the line 3—3 of Fig. 1; and Fig. 4 is a top plan view of a modified form of upper or flower-receiving loop.

Referring to the drawing, a flower holder comprising one embodiment of the invention is shown as being formed from a single strand of wire of any desired cross section and similar physical characteristics. The upper part of the holder is shown as being in the form of a relatively large loop 1, adapted to receive the calyx 2 of a flower 3, the ends of said loop being brought together at the rear, and one of them extending freely downwardly to form a resilient safety pin portion 4, having a pointed extremity 5, while the other also extends downwardly to form a shank 6, upon the lower end of which is a smaller forwardly extending loop 7 adapted to receive the stem 8 of said flower. Rearwardly of this lower loop the wire extends freely rearwardly and thence reversely forwardly to provide a looped clasp 9, the opposite forward side 10 of which is reversely curved to form a looped portion 11, within which the pin 4 is yieldingly retained while operatively supporting the holder upon the lapel of a coat, or other suitable supporting element.

Figure 4:
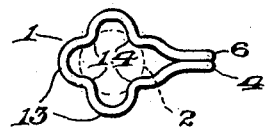

Referring to Fig. 4, the modified form of upper loop 1' here shown comprises alternately positioned, circumferentially spaced, radially outwardly and inwardly extending curved portions 13 and 14 preferably lying in the same plane, the inwardly extending portions being relatively abruptly curved and so designed as to "pinch" into the calyx 2 of a flower, such as a carnation, or other object supported by the improved holder.

It should be noted of primary importance that this complete holder is formed from a single strand of wire, but that if desired for any reason, such as for rigidity or the like, the rear portion of either or both of said loops, or the adjacent upper portions of the shank or stem, may be secured together as illustrated by the band 12. However, while one embodiment of the invention has been disclosed in the drawing, it is to be understood that numerous modifications may be made in the minor details of construction and operation, without departing from the scope of the appended claim. It should also be noted that while not absolutely essential, the pin portion 4 may extend substantially vertically, while the shank portion 6 extends diagonally forwardly as it progresses downwardly, so as to thereby bring the axes of the spaced looped portions 1 and 7 more nearly into vertical alignment, and also in order that the hooked portion 11 of the clasp will hold the pin in substantial parallelism with the stem of a flower supported by the holder as a unit.

Having thus described my invention, what I claim as new and desire to protect by Letters Patent of the United States is:

A flower holder, comprising an upper looped portion from the rear of which depend integral shank and pin portions, a forwardly extending lower looped portion comprising an integral extension of said shank portion, said looped portions lying in spaced substantially parallel planes, a clasp comprising a rearward integral extension of said lower looped portion, and receiving and releasably retaining the free end of said pin portion, said upper looped portion comprising circumferentially spaced, radially inwardly and abruptly curved portions, adapted to simultaneously pinch into but without mutilating the calyx of a flower or other object extending through the loop, and means to prevent the enlargement of at least one of said looped portions.

JOHN W. MUMFORD.